United States Patent
Dong et al.

(10) Patent No.: US 10,941,827 B2
(45) Date of Patent: Mar. 9, 2021

(54) FRICTION MATERIAL

(71) Applicant: BorgWarner Inc., Auburn Hills, MI (US)

(72) Inventors: Feng Dong, Rochester, MI (US); Wanjun Liu, Troy, MI (US)

(73) Assignee: BorgWarner Inc., Auburn Hills, MI (US)

( * ) Notice: Subject to any disclaimer, the term of this patent is extended or adjusted under 35 U.S.C. 154(b) by 118 days.

(21) Appl. No.: 16/166,616

(22) Filed: Oct. 22, 2018

(65) Prior Publication Data

US 2019/0120315 A1 Apr. 25, 2019

Related U.S. Application Data

(60) Provisional application No. 62/575,870, filed on Oct. 23, 2017.

(51) Int. Cl.
*F16D 69/02* (2006.01)
*C08L 83/04* (2006.01)
(Continued)

(52) U.S. Cl.
CPC ............ *F16D 69/026* (2013.01); *C08L 83/04* (2013.01); *F16D 69/028* (2013.01); *F16D 69/04* (2013.01);
(Continued)

(58) Field of Classification Search
CPC ............... C08L 83/04; F16D 2069/002; F16D 2069/003; F16D 2200/0056; F16D 2200/006; F16D 69/026; F16D 69/028; F16D 69/04; F16D 69/023; F16D 13/64; F16D 2250/0028; B32B 2475/00;
(Continued)

(56) References Cited

U.S. PATENT DOCUMENTS 5,563,196 A * 10/1996 Kitahara ............... F16D 69/026
524/14
5,856,244 A 1/1999 Lam et al.
(Continued)

FOREIGN PATENT DOCUMENTS

EP          0637698 A1    2/1995
WO     2006116474 A2    11/2006
(Continued)

OTHER PUBLICATIONS

RD385019, Derwent, May 1996.*
(Continued)

*Primary Examiner* — Camie S Thompson
(74) *Attorney, Agent, or Firm* — Howard & Howard Attorneys PLLC

(57) ABSTRACT

A friction material presents a friction generating surface and a bonding surface facing opposite the friction generating surface. The friction material includes an organopolysiloxane resin, a plurality of fibers, and a plurality of friction particles. The organopolysiloxane resin includes siloxy units independently represented by the following formula: $(R_1SiO_{3/2})$ and/or $(R_2SiO_{2/2})$; wherein each $R_1$ and $R_2$ is independently selected from a monovalent hydrocarbon group having from 1 to 20 carbon atoms.

21 Claims, 10 Drawing Sheets

(51) Int. Cl.
*F16D 69/04* (2006.01)
*B32B 3/30* (2006.01)
*B32B 5/02* (2006.01)
*B32B 5/16* (2006.01)
*B32B 7/12* (2006.01)
*B32B 15/08* (2006.01)
*B32B 27/28* (2006.01)
*B32B 33/00* (2006.01)
*F16D 69/00* (2006.01)

(52) U.S. Cl.
CPC . *B32B 3/30* (2013.01); *B32B 5/02* (2013.01); *B32B 5/16* (2013.01); *B32B 7/12* (2013.01); *B32B 15/08* (2013.01); *B32B 27/283* (2013.01); *B32B 33/00* (2013.01); *B32B 2264/06* (2013.01); *B32B 2264/102* (2013.01); *B32B 2264/108* (2013.01); *B32B 2383/00* (2013.01); *B32B 2475/00* (2013.01); *F16D 2069/002* (2013.01); *F16D 2069/003* (2013.01); *F16D 2069/008* (2013.01); *F16D 2069/0466* (2013.01); *F16D 2200/006* (2013.01); *F16D 2200/0052* (2013.01); *F16D 2200/0056* (2013.01)

(58) Field of Classification Search
CPC . B32B 27/283; B32B 2264/108; C04B 30/02; C04B 41/5001; C04B 41/4961; C04B 14/022; C04B 14/08; C04B 14/386; C04B 2111/00362; C04B 2111/00612; C08K 3/04
USPC ......... 428/297.4, 304.4, 306.6, 312.6, 317.9, 428/364; 524/14, 15, 16, 35, 448, 495, 524/496, 733; 523/149, 158; 427/203, 427/201, 389.9; 442/101, 73, 148, 75, 442/72, 74
See application file for complete search history.

(56) References Cited

U.S. PATENT DOCUMENTS

| | | |
|---|---|---|
| 6,074,993 A | 6/2000 | Waddoups et al. |
| 6,265,066 B1 | 7/2001 | Suzuki et al. |
| 6,586,373 B2 | 7/2003 | Suzuki et al. |
| 7,326,742 B2 | 2/2008 | Kawabata et al. |
| 7,806,975 B2 | 10/2010 | Lam et al. |
| 9,777,785 B2 | 10/2017 | Dong et al. |
| 2004/0213980 A1 | 10/2004 | Babayan et al. |
| 2006/0009541 A1* | 1/2006 | Chen ............... F16D 13/64 523/149 |

FOREIGN PATENT DOCUMENTS

| | | |
|---|---|---|
| WO | 2017100001 A1 | 6/2017 |
| WO | 2017117038 A1 | 7/2017 |

OTHER PUBLICATIONS

Wacker Chemie AG, "Silicone Resins", 2014, XP055556180, retrieved from http://web.archive.org/web/2040512053244/https://www.wacker.com/cms/en/products/product_groups/silicone_resins.jps on Feb. 13, 2019, 3 pages.
Starfire Systems, "Silamide SIL-1400 Technical Data Sheet", 2014, 1 page.
Starfire Systems, "Polyramic SPR-684" 2014, 1 page.
Wacker, "MK Resin Powder Technical Data Sheet" 2014, 2 pages.
Wacker, "SILRES H44 Technical Data Sheet", 2014, 2 pages.
Wacker, "SILRES MSE 100", 2012, 2 pages.

* cited by examiner

FRICTION MATERIAL

CROSS-REFERENCE TO RELATED APPLICATIONS

This application claims priority to and all the benefits of U.S. Provisional Patent Application No. 62/575,870, filed on Oct. 23, 2017, the disclosure of which is hereby incorporated by reference.

FIELD OF THE DISCLOSURE

The subject disclosure generally relates to a friction material. The friction material can be used in a friction plate in a clutch assembly in a transmission.

DESCRIPTION OF THE RELATED ART

Several components of a motor vehicle powertrain may employ a wet clutch to facilitate the transfer of power from the vehicle's power generator (i.e. an internal combustion engine, electric motor, fuel cell, etc.) to the drive wheels. A transmission located downstream from the power generator which enables vehicle launch, gear shifting, and other torque transfer events is one such component. Some form of a wet clutch may be found throughout many different types of transmissions currently available for motor vehicle operation. A wet clutch may be utilized in a torque converter for an automatic transmission, a multi-plate wet clutch pack for an automatic transmission or a semi-automatic dual-clutch transmission (DCT), and a wet start clutch that may be incorporated into a sportier automatic transmission equipped with as many as seven to nine gears as a substitute for the torque converter, to name but a few exemplary applications. Similar wet clutches may be found elsewhere in the vehicle powertrain besides the transmission.

A wet clutch is an assembly that interlocks two or more opposed, rotating surfaces in the presence of a lubricant by imposing selective interfacial frictional engagement between those surfaces. A friction plate, a band, a synchronizer ring, or some other part that provides one of these engageable rotating surfaces typically supports a friction material to effectuate the intended interlocking frictional engagement. The friction material is typically secured to the engageable rotating surface with an adhesive. The presence of the lubricant at the friction interface cools and reduces wear of the friction material and permits some initial slip to occur so that torque transfer proceeds gradually, although very quickly, in an effort to avoid the discomfort that may accompany an abrupt torque transfer event (i.e. shift shock).

The friction material must function reliably in wet clutch applications, especially the more recent clutch applications such as wet start clutch applications and shifting applications, e.g. semi-automatic DCT applications. That is, the friction material must maintain sufficient performance properties, e.g. coefficient of friction ("COF"), strength, and durability, over a range of conditions—especially at higher temperatures and in the presence of water. There is a need for improved friction materials which maintain sufficient performance properties, e.g. coefficient of friction ("COF"), strength, and durability, at higher temperatures and in the presence of water.

SUMMARY OF THE DISCLOSURE AND ADVANTAGES

A friction material presents a friction generating surface and a bonding surface facing opposite the friction generating surface. The friction material includes an organopolysiloxane resin, a plurality of fibers, and a plurality of friction particles. The organopolysiloxane resin includes siloxy units independently represented by the following formula: $(R_1SiO_{3/2})$ and/or $(R_2SiO_{2/2})$; wherein each $R_1$ and $R_2$ is independently selected from a monovalent hydrocarbon group having from 1 to 20 carbon atoms. A method of manufacturing the friction material includes the steps of: providing the organopolysiloxane resin, the plurality of fibers, and the plurality of friction particles; combining the plurality of fibers and the plurality of friction particles to form a substrate material; impregnating the substrate material with the resin; and curing the resin to form the friction material.

The components of the friction material, in particular the organopolysiloxane resin, yield a cured friction material with excellent friction properties (e.g. coefficient of friction (COF)), strength, and durability, over a range of conditions. More specifically, the organopolysiloxane resin improvises the temperature resistance of the friction material and significantly improves the COF of the friction material.

BRIEF DESCRIPTION OF THE DRAWINGS

Other advantages of the present invention will be readily appreciated, as the same becomes better understood by reference to the following detailed description when considered in connection with the accompanying drawings.

FIGS. 1-12 are exemplary in nature and are not drawn to scale and are, thus, not intended to represent the relative sizes of the various components of the friction material, e.g. the fibers, the friction particles, the pores, etc.

DETAILED DESCRIPTION OF THE DISCLOSURE

Figure 1:
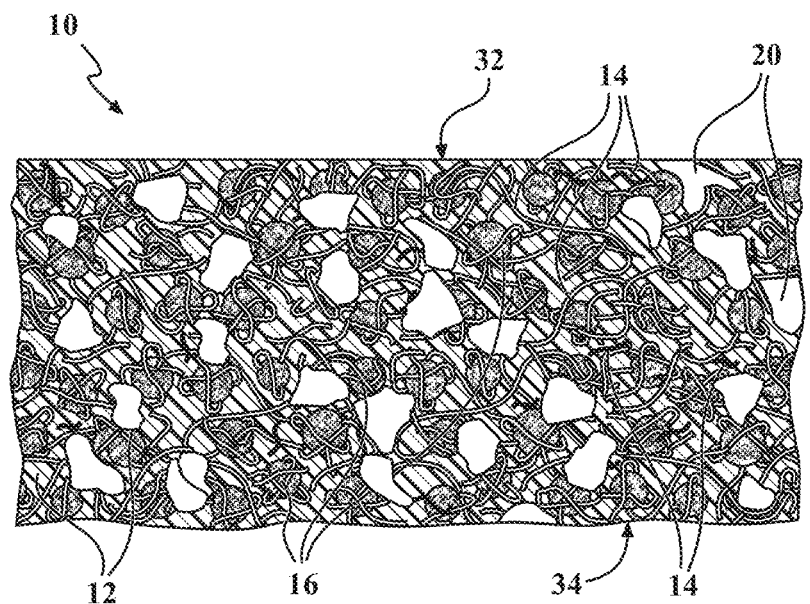
FIG. 1 is an enlarged cross-sectional view of a friction material including an organopolysiloxane resin.

Referring to the Figures, wherein like numerals indicate corresponding parts throughout the several views, a friction material comprising an organopolysiloxane resin 12 is shown generally at 10 and a friction plate including the friction material 10 is shown generally at 36.

The friction material 10 can be manufactured and cured efficiently. Once cured, the friction material 10 is typically used on the friction plate 36 which is included in a wet clutch assembly in a transmission 42 of a motor vehicle. The friction plate 36 includes the friction material 10 and a substrate 38. As is known in the art, the friction material 10 is designed to be adhered to the substrate 38, e.g. a metal plate, to form the friction plate 36. The substrate 38 has two surfaces and the friction material 10 may be adhered to one or both of these surfaces, e.g. with the bonding adhesive 40 as is known in the art. The friction plate 36 may be used, sold, or provided with a separator plate to form a clutch pack or clutch assembly.

The friction material 10 includes the organopolysiloxane resin 12, a plurality of fibers 14, and a plurality of friction particles 16. The friction material 10 is typically porous with the organopolysiloxane resin 12 dispersed throughout. The friction material 10 presents a friction generating surface 32 and a bonding surface 34 facing opposite (and parallel to) the friction generating surface 32. Once the friction material 10 is cured, e.g. exposed to elevated temperatures such that the organopolysiloxane resin 12 cross-links or cures, the bonding surface 34 is typically adhered to the substrate 38 (e.g. the metal plate) and the friction generating surface 32 is used to generate friction. The organopolysiloxane resin 12, the fibers 14, and the friction particles 16, are discussed in greater detail below.

The Organopolysiloxane Resin:

The friction material 10 includes the organopolysiloxane resin 12 (which can be cured or uncured). The organopolysiloxane resin 12 is also referred to in the art as binder. The terminology "substrate material" describes embodiments of the friction material 10 that are free of (not yet impregnated with) the organopolysiloxane resin 12. In other words, the substrate material comprises all of the components of the friction material 10 with the exception of the organopolysiloxane resin 12.

In various embodiments, the organopolysiloxane resin 12 is present in the friction material 10 in an amount of less than about 105, alternatively less than about 60, alternatively less than about 55, alternatively less than about 45, alternatively less than about 40, alternatively less than about 35, alternatively from about 15 to about 100, alternatively from about 30 to about 70, alternatively from about 35 to about 55, alternatively from about 40 to about 55, alternatively from about 20 to about 35, alternatively from about 25 to about 30, weight percent based on the total weight of the substrate material. This amount is sometimes described as organopolysiloxane resin 12 "pick up." In additional non-limiting embodiments, all values and ranges of values within and including the aforementioned range endpoints are hereby expressly contemplated. The amount of the organopolysiloxane resin 12 present in the friction material 10 may vary outside of the ranges above, but is typically both whole and fractional values within these ranges. Further, it is to be appreciated that more than one type of the organopolysiloxane resin 12 may be included in the friction material 10, in which case the total amount of the organopolysiloxane resin 12 present in the friction material 10 is within the above ranges. The organopolysiloxane resin 12 is disposed or dispersed throughout the friction material 10. In other words, the organopolysiloxane resin 12 may be dispersed homogeneously or heterogeneously throughout the friction material 10. In various embodiments, the organopolysiloxane resin 12 may partially or wholly encapsulate the fiber(s) 14 and/or the friction particle(s) 16.

In various embodiments, depending on the stage of formation of the friction material 10, the organopolysiloxane resin 12 may be not cured at all, partially cured, or less than entirely cured. In other words, the organopolysiloxane resin 12 may be cured, uncured, or partially cured, depending on which stage of the manufacturing process is reviewed. In a typical embodiment, the organopolysiloxane resin 12 is cured thermally (e.g. via a high temperature bake). Once cured, the organopolysiloxane resin 12 confers strength and rigidity to the friction material 10 and adheres the fibers 14, the friction particles 16, etc., while maintaining a desired porosity for proper lubricant flow and retention. It should also be understood when the friction material 10 is described as "cured" or as comprising a "reaction product," the friction material 10 includes cured organopolysiloxane resin 12.

As is set forth above, the friction material 10 includes the organopolysiloxane resin 12. The organopolysiloxane resin 12 is a polymer(s) comprising siloxy units independently selected from $(R_3SiO_{1/2})$, $(R_2SiO_{2/2})$, $(R_1SiO_{3/2})$, or $(SiO_{4/2})$ siloxy units, where each of $R_1$, $R_2$, and $R_3$ may independently be any organic group, alternatively each of $R_1$, $R_2$, and $R_3$ may independently be a hydrocarbon group containing 1 to 30 carbons, alternatively each of $R_1$, $R_2$, and $R_3$ may independently be an alkyl group containing 1 to 12 carbon atoms, or alternatively each of $R_1$, $R_2$, and $R_3$ may independently be methyl or phenyl. These siloxy units are commonly referred to as M, D, T, and Q units respectively. Their molecular structures are shown below:

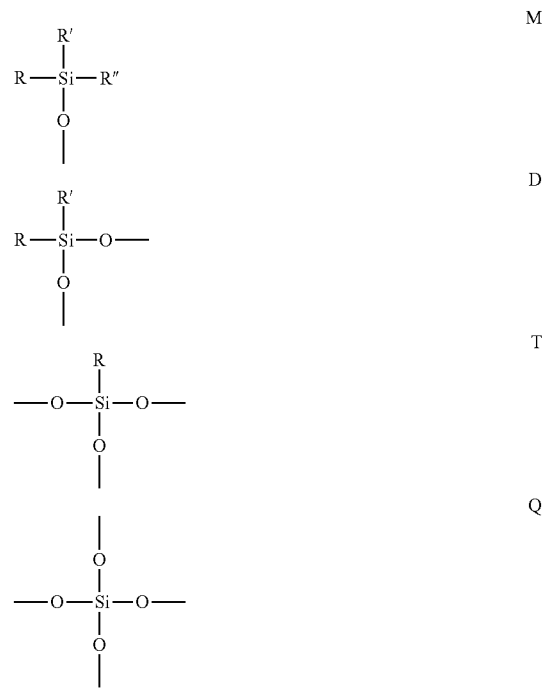

These siloxy units can be combined in various manners to form cyclic, linear, or branched structures. The chemical and physical properties of the resulting polymeric structures vary depending on the number and type of siloxy units in the organopolysiloxane.

In many embodiments, the organopolysiloxane resin 12 comprises siloxy units represented by the following formula: $(R_1SiO_{3/2})$ and/or $(R_2SiO_{2/2})$, wherein each $R_1$ and $R_2$ is a monovalent hydrocarbon group having from 1 to 20 carbon atoms. In some more specific embodiments, each $R_1$ and $R_2$ is selected from a methyl, an ethyl, a propyl, a butyl, a hexyl, an octyl, a decyl, a cyclohexyl, a phenyl, a tolyl, a xylyl, a benzyl, and a phenylethyl group. In some embodiments, the organopolysiloxane resin 12 is a phenyl methyl polysiloxane resin. In other embodiments, the organopolysiloxane resin 12 is a methyl polysiloxane resin.

The organopolysiloxane resin 12 typically comprises end groups selected from [—OH], [—OCH$_3$], and [—OC$_2$H$_5$].

In some embodiments, the organopolysiloxane resin 12 comprises siloxy units independently represented by the formula:

$(R_1SiO_{3/2})$;

wherein each $R_1$ is independently an alkyl group, cycloaliphatic group, or an aralkyl group. For example, in some embodiments, each $R_1$ is independently selected from a methyl, an ethyl, a propyl, a hexyl, an octyl, a decyl, a cyclohexyl, a phenyl, a tolyl, a xylyl, a benzyl, and a phenylethyl group.

In some such embodiments, the organopolysiloxane resin 12 is a silsesquioxane comprising siloxy units independently represented by the formula:

$(R_1SiO_{3/2})$;

wherein each $R_1$ is a selected from methyl and phenyl groups. In some such embodiments, the friction material 10 comprises $R_1$ methyl groups and $R_1$ phenyl groups in a ratio of from about 1:1 to about 1:3, alternatively from about 1:1.5 to about 1:2.5. In other such embodiments greater than about 30, alternatively greater than about 50, alternatively greater than about 70, alternatively greater than about 75, alternatively greater than about 80, alternatively greater than about 85, alternatively greater than about 90, alternatively greater than about 95, alternatively greater than about 96, alternatively greater than about 97, alternatively greater than about 98, alternatively greater than about 99, % of the total $R_1$ groups on the organopolysiloxane resin 12 are methyl groups. Of course, in some embodiments, all of the $R_1$ groups on the organopolysiloxane resin 12 are methyl groups, i.e., each $R_1$ is a methyl group. That is, 100% of the $R_1$ groups on the organopolysiloxane resin 12 are methyl groups.

For example, in some preferred embodiments, the organopolysiloxane resin 12 is a phenyl methyl silsesquioxane having the following formula:

$[(C_6H_5)_{0.62}—(CH_3)_{0.31}R_{0.07}SiO_{1.5}]_n$ wherein n is 20, and R is selected from [—OH] and [—OC$_2$H$_5$] groups. In many such embodiments, the organopolysiloxane resin 12 has a $T_g$ of equal to or greater than about 40° C. and/or a decomposition temperature of equal to or greater than about 500° C.

In other embodiments, the organopolysiloxane resin 12 comprises siloxy units independently represented by the formula:

$(R_3SiO_{1/2})$, $(R_2SiO_{2/2})$, $(R_1SiO_{3/2})$, and/or $(SiO_{4/2})$ wherein each $R_1$, $R_2$, and $R_3$ is independently selected from an alkyl group, cycloaliphatic group, or an aralkyl group. For example, in some embodiments, each $R_1$, $R_2$ and $R_3$ is independently selected from a methyl, an ethyl, a propyl, a butyl, a hexyl, an octyl, a decyl, a cyclohexyl, a phenyl, a tolyl, a xylyl, a benzyl, and a phenylethyl group.

In some such embodiments, the organopolysiloxane resin 12 is further defined as a branched siloxane. In such embodiments, there is at least one siloxy unit independently represented by the formula $(R_1SiO_{3/2})$ and/or $(SiO_{4/2})$.

For example, in some embodiments, the organopolysiloxane resin 12 comprises siloxy units independently represented by the following formula:

$(R_1SiO_{3/2})$, $(R_2SiO_{2/2})$, and optionally $(SiO_{4/2})$ wherein each $R_1$ and $R_2$ is independently selected from an alkyl group, a cycloaliphatic group, or an aralkyl group. In one particular embodiment, each $R_1$ and $R_2$ is independently a methyl group.

In many embodiments, the organopolysiloxane resin 12 comprises siloxy units independently represented by the following formula:

$(R_1SiO_{3/2})$, $(R_2SiO_{2/2})$, and/or $(SiO_{4/2})$ wherein each $R_1$ and $R_2$ is independently selected from a phenyl group and a methyl group. Alternatively, in some such embodiments greater than about 50, alternatively greater than about 60, alternatively greater than about 70, alternatively greater than about 75, alternatively greater than about 80, alternatively greater than about 85, alternatively greater than about 90, alternatively greater than about 95, alternatively greater than about 96, alternatively greater than about 97, alternatively greater than about 98, alternatively greater than about 99, % of the total $R_1$ and $R_2$ groups on the organopolysiloxane resin 12 are methyl groups. Of course, in some embodiments, all of the $R_1$ and $R_2$ groups on the organopolysiloxane resin 12 are methyl groups. That is, 100% of the $R_1$ and $R_2$ groups on the organopolysiloxane resin 12 are methyl groups.

In many embodiments, the organopolysiloxane resin 12 has an SiO$_2$ content of greater than about 55, alternatively greater than about 60, alternatively greater than about 65, alternatively greater than about 70, alternatively greater than about 75, alternatively greater than about 80, weight percent based on a total weight of the resin 12.

The organopolysiloxane resin 12 may have excellent thermal stability, with a thermal decomposition temperature of equal to or greater than about 300, alternatively about 350, alternatively about 400, alternatively about 450, alternatively about 500, ° C.

In some embodiments, the organopolysiloxane resin 12 is a solid, which has a melting point of from about 35 to about 60, alternatively from about 45 to about 55, ° C.

In one embodiment, the organopolysiloxane resin 12 is further defined as a phenyl methyl polysiloxane resin such as Silres® H44 which is commercially available from Wacker Chemie AG. In a preferred embodiment, the organopolysiloxane resin 12 is further defined as a methyl polysiloxane resin such as Silres® MK which is commercially available from Wacker Chemie AG.

In some embodiments, the organopolysiloxane resin 12 is used with a catalyst. Catalysts may promote cure of the organopolysiloxane resin 12 upon exposure to elevated temperatures. Catalysts can be used individually or as a combination of two or more. Examples of suitable catalysts include acids, such as carboxylic acids, e.g. formic acid, acetic acid, propionic acid, butyric acid, and/or valeric acid;

bases and basic organic salts such as tetrabutylammonium acetate; metal salts of organic acids, such as dibutyl tin dioctoate, dibutyltin dilaurate (DBTL), iron stearate, and/or lead octoate; titanate esters, such as tetraisopropyl titanate and/or tetrabutyl titanate; chelate compounds, such as acetylacetonato titanium; aminopropyltriethoxysilane, and the like; amines and their derivatives, such as triethanolamine, hydrochloride salts of amines, and hydrobromide salts of amines; organofunctional silanes such as N-(2-aminoethyl)-3-aminopropyltrimethoxysilan; and metal acetylacetonates such as titanium acetylacetonate, zinc acetylacetonate. In some particular embodiments, the catalyst is selected from triethanolamine, tetrabutylammonium acetate, N-(2-aminoethyl)-3-aminopropyltrimethoxysilan, benzyl(trimethyl)ammonium acetate, dibutyltin dilaurate, and combinations thereof. If included, the catalyst is typically present in an amount of from greater than from about 0 to about 6, alternatively from about 0.5 to about 5, alternatively from about 0.5 to about 3.5, weight percent based on a total weight of the resin included in the friction material 10. In additional non-limiting embodiments, all values and ranges of values within and including the aforementioned range endpoints are hereby expressly contemplated. The amount of the catalyst present in the friction material 10 may vary outside of the ranges above, but is typically both whole and fractional values within these ranges. Further, it is to be appreciated that more than one type of catalyst may be included in the friction material 10, in which case the total amount of all the catalyst present in the friction material 10 is within the above ranges. Of course, in some embodiments, the friction material 10 may be free of catalyst.

In some embodiments, the friction material 10 can include a supplemental resin in addition to the organopolysiloxane resin 12. The supplemental resin may be any thermosetting organopolysiloxane resin 12 suitable for providing structural strength to the friction material 10. For example, the supplemental resin may be a phenolic resin, or a modified phenolic resin (e.g. an epoxy phenolic, etc.). A phenolic resin is a class of thermosetting resins that is produced by the condensation of an aromatic alcohol, typically a phenol, and an aldehyde, typically a formaldehyde. Some examples of other supplemental resins include, but are not limited to, epoxy resins, polybutadiene resins, etc. In embodiments that include a supplemental resin, the supplemental resin is typically present in an amount of less than about 80, alternatively less than about 45, alternatively less than about 40, alternatively less than about 35, alternatively less than about 30, alternatively less than about 25, alternatively less than about 20, alternatively less than about 15, alternatively less than about 10, alternatively less than about 5, alternatively less than about 4, alternatively less than about 3, weight percent based on a total weight of the resin included in the friction material 10. In additional non-limiting embodiments, all values and ranges of values within and including the aforementioned range endpoints are hereby expressly contemplated. The amount of the supplemental resin present in the friction material 10 may vary outside of the ranges above, but is typically both whole and fractional values within these ranges. Further, it is to be appreciated that more than one type of the supplemental resin may be included in the friction material 10, in which case the total amount of all the supplemental resin present in the friction material 10 is within the above ranges.

In various embodiments, the organopolysiloxane resin 12 is present in an amount of from about 1 to about 100, alternatively from about 15 to about 100, alternatively from about 15 to about 80, alternatively from about 25 to about 80, alternatively from about 30 to about 60, weight percent based on the total weight of the substrate material. In additional non-limiting embodiments, all values and ranges of values within and including the aforementioned range endpoints are hereby expressly contemplated. The amount of the organopolysiloxane resin 12 present in the friction material 10 may vary outside of the ranges above, but is typically both whole and fractional values within these ranges. Further, it is to be appreciated that more than one type of the organopolysiloxane resin 12 may be included in the friction material 10, in which case the total amount of all the organopolysiloxane resin 12 present in the friction material 10 is within the above ranges. Furthermore, it is to be appreciated that a supplemental resin 12 may also be included in the friction material 10, in which case the total amount of all the organopolysiloxane resin 12 and the supplemental present in the friction material 10 is within the above ranges.

Fibers:

The friction material 10 includes the plurality of fibers 14. The fibers 14 may be alternatively described as the fibers 14 or the fiber 14. The fibers 14 may be woven, non-woven, or any other suitable construction. In various embodiments, the fibers 14 of the friction material 10 are, include, comprise, consist essentially of, or consist of, aramid fibers, carbon fibers, cellulose fibers, acrylic fibers, polyvinyl alcohol fibers, glass fibers, mineral fibers, and combinations thereof. All weight ranges and ratios of the various combinations of the aforementioned fiber types are hereby expressly contemplated in various non-limiting embodiments.

In some embodiments, the fibers 14 include aramid. In many embodiments, the fibers 14, include, comprise, consist essentially of, or consist of, aromatic polyamide, i.e., aramid. Aramid fibers are a class of heat-resistant and strong synthetic fibers. In some embodiments, the aromatic polyamide is a meta-aramid fiber. In other embodiments, the aromatic polyamide is a para-aramid. The aramid fibers may be pulp or flock of various lengths and diameters. In a preferred embodiment, the fibers 14 are, include, comprise, consist essentially of, or consist of, para-aramid (para-aromatic polyamide).

Aramids are typically formed by reacting amines and carboxylic acid halides. In one embodiment, the aramid is further defined as having at least about 85 percent of amide linkages (—CO—NH—) attached directly to two aromatic rings. In some embodiments, additives can be used with the aramid, and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. To this end, the aramid fibers contemplated and disclosed herein also include aramid copolymers, e.g. polymers including amide and other linkages.

In some embodiments, the aramid fiber has a diameter of from about 1 to about 500, alternatively from about 1 to about 50, alternatively from about 2 to about 50, alternatively from about 1 to about 25, alternatively from about 2 to about 25, alternatively from about 1 to about 15, alternatively from about 1 to about 10, μm, and a length of no greater than about 6, alternatively no greater than about 5, alternatively no greater than about 4, alternatively no greater than about 3, alternatively from about 1 to about 6, alternatively from about 1 to about 5, alternatively from about 1 to about 4, alternatively from about 2 to about 4, alternatively from about 2 to about 3, mm. Alternatively, in some embodiments, the aramid has a surface area of from about 0.08 to about 0.6 square meters per gram.

In some embodiments, the fibers 14 include a combination of: (1) aramid pulp having a diameter of from about 2 to about 50 µm and a length of from about 3 to about 15 mm; and (2) aramid floc having a diameter of from about 2 to about 50 µm and a length of no greater than about 3 mm. In some such embodiments, the pulp and the floc is respectively present in a weight ratio of from about 2:1 to about 20:1, or about 3:1 to about 7:1.

In some embodiments, the fibers 14 include carbon fibers. The presence of carbon fibers aids in increasing thermal resistance, maintaining a steady coefficient of friction and increasing the squeal resistance. Carbon fibers can provide good heat conduction such that the friction material 10 has a desired heat resistance. In many embodiments, the use of aramid fibers and carbon fibers improves the ability of the friction material 10 to withstand high temperatures.

In some embodiments, the fibers 14 include cellulose fibers. The cellulose fibers contribute to surface smoothness of the friction material 10, thereby making the friction material 10 more stable during operation. In certain embodiments the cellulose fibers include fibers that have a flat and wide surface. The cellulose fibers can also improve the friction material's 10 "break-in" characteristics at an economical cost.

For example, in various embodiments, the fibers 14 comprise natural cellulose, regenerated cellulose, a cellulose derivative, or a mixture thereof. In some embodiments, the fibers 14 comprise at least about 50 wt. %, alternatively at least about 60 wt. %, alternatively at least about 70 wt. %, alternatively at least about 80 wt. %, of natural cellulose, regenerated cellulose, a cellulose derivative, or a mixture thereof. Natural cellulose is a straight chain polysaccharide that includes repeating $\beta(1\rightarrow4)$-glycosidic-linked glucose units and which has the general polymeric formula $(C_6H_{10}O_5)_n$ with the number of repeating units ("n") usually ranging from 100 to 10,000. Regenerated cellulose has the same chemical formula as natural cellulose and is prepared from naturally-occurring polymers (e.g. wood pulp or bamboo) from one of several processes including the viscose process, the cuprammonium process, and an organic solvent spinning process. Some examples of regenerated cellulose are rayon, modal, and lyocell. A cellulose derivative is a modified cellulose in which the hydroxyl group on the glucose units is fully or partially substituted with, for example, an ester group. Some examples of a cellulose derivative are cellulose acetate and cellulose triacetate.

In some embodiments, the cellulose fibers are derived from wood, e.g. birch fibers and/or eucalyptus fibers. In other embodiments, the cellulose fibers comprise cotton fibers. The cotton fibers aid in providing shear strength to the friction material 10. The cotton fibers typically have fibrillated strands attached to a main fiber core and aid in preventing delamination of the friction material 10 during use.

In some embodiments, the fibers 14 include polyvinyl alcohol fibers. Polyvinyl alcohols are commercially available, or they can be made by polymerizing a vinyl acetate monomer. In various embodiments, the fibers 14 are soluble in water at a temperature of about 60° C. or greater. The solubility of the fibers 14 are believed to improve the "wet strength" of the friction material 10. The increased wet strength of the friction material 10 allows for the optimization of the components included in the material and also allows for efficient manufacturing. The wet strength of the friction material 10 before the organopolysiloxane resin 12 addition is evaluated by test method ASTM D 828-97.

In some embodiments, the fibers 14 include a silane surface treatment, which is disposed about outer peripheral surface fibers 14. The silane improves the adhesion of the fibers 14 to the components within the friction material 10 (e.g. the friction particles 16, the organopolysiloxane resin 12, etc.). The silane may include, but is not limited to, glycidoxypropyltrimethoxysilane, aminoethylaminopropyltrimethoxysilane, methacryloxypropyltrimethoxysilane, gamma-aminopropyltriethoxysilane, vinylbenzylaminoethylaminopropyltrimethoxysilane, glycidoxypropylmethyldiethoxysilane, chloropropyltrimethoxysilane, phenyltrimethoxysilane, vinyltriethoxysilane, tetraethoxysilane, methyldimethoxysilane, bis-triethoxysilylpropyldisulfidosilane, bis-triethoxysilylpropyltetrasulfidosilane, phenyltriethoxysilane, aminosilanes, and combinations thereof.

In various embodiments, the fibers 14 have average diameters of from about 1 to about 500, alternatively from about 2 to about 80, alternatively from about 2 to about 60, µm, and average lengths of from about 1 to about 20, alternatively from about 1 to about 15, alternatively from about 1 to about 10, alternatively from about 1 to about 6, alternatively from about 1 to about 5, alternatively from about 1 to about 4 alternatively from about 1 to about 3, alternatively from about 2 to about 20, alternatively from about 2 to about 15, alternatively from about 2 to about 10, alternatively from about 2 to about 8, alternatively from about 4 to about 6, mm. Alternatively, in some embodiments, the fibers 14 has a surface area of from about 0.6 to about 20 square meters per gram. In additional non-limiting embodiments, all values and ranges of values within and including the aforementioned range endpoints are hereby expressly contemplated.

In many embodiments, the plurality of fibers have a degree of fibrillation as measured according to Canadian Standard Freeness ("CSF") of from about 5 to about 800. CSF is an empirical test procedure that measures the rate at which 3 grams of a fibrous pulp material in 1 liter of water may be drained. CSF measurements are conducted in accordance with the TAPPI T227 test procedure. In making CSF measurements, it is noted that more fibrillated fibers will have a lower water drainage rate and, thus, a lower "ml CSF" value, and that less fibrillated fibers will have a higher "ml CSF" value. To this end, CSF is considered by those skilled in the art as a measure of the degree of fibrillation.

In various embodiments, the fibers 14 typically have a degree of fibrillation as measured according to CSF of from about 5 to about 800, alternatively from about 100 to about 800, alternatively from about 200 to about 800, alternatively from about 300 to about 800, alternatively from about 200 to about 600, alternatively from about 10 to about 200, alternatively from about 10 to about 100, alternatively from about 10 to about 640, alternatively from about 10 to about 500, alternatively from about 100 to about 640, alternatively from about 100 to about 500, ml CSF. In additional non-limiting embodiments, all values and ranges of values within and including the aforementioned range endpoints are hereby expressly contemplated.

In various embodiments, the fibers 14 are present in an amount of from about 1 to about 90, alternatively from about 1 to about 75, alternatively from about 5 to about 75, alternatively from about 20 to about 75, alternatively from about 30 to about 75, weight percent based on the total weight of the substrate material. In additional non-limiting embodiments, all values and ranges of values within and including the aforementioned range endpoints are hereby expressly contemplated. The amount of the fibers 14 present in the friction material 10 may vary outside of the ranges above, but is typically both whole and fractional values within these ranges. Further, it is to be appreciated that more than one type of the fibers 14 may be included in the friction material 10, in which case the total amount of all the fibers 14 present in the friction material 10 is within the above ranges.

Friction Particles:

The friction material 10 includes the plurality of friction particles 16. The plurality of friction particles 16 may be alternatively described as the friction particles 16, or the friction particle 16.

The friction particles 16 are not particularly limited in type and may be chosen from diatomaceous earth, graphite, silica, and combinations thereof. The friction particles 16 may be reinforcing or non-reinforcing. In various embodiments, the friction particles 16 of the friction material 10 are, include, comprise, consist essentially of, or consist of, diatomaceous earth, graphite, silica, and combinations thereof. In various embodiments, the friction particles 16 are diatomaceous earth. The friction particles 16 may be free of silica. All weight ranges and ratios and combinations of the aforementioned friction particle types are hereby expressly contemplated in various non-limiting embodiments. For example, some embodiments may include diatomaceous earth and graphite, but be free of silica, while other embodiments may include diatomaceous earth, graphite, and silica.

In other embodiments, the friction particles 16 are, include, consist essentially of, or consist of silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, cashew nut, rubber, and combinations thereof.

In various embodiments, the friction particles 16 are, include, consist essentially of, or consists of, diatomaceous earth. Diatomaceous earth is a mineral including silica. In some such embodiments, the diatomaceous earth has an average diameter of from about 0.1 µm to about 30 µm and a Mohs hardness of from about 3 to about 9. Of course, all of the particles of the friction particles 16 may be diatomaceous earth or, alternatively, may include a combination of different types of particles such as various combinations of diatomaceous earth, carbon, graphite, and alumina. The type or types of friction particles 16 may vary depending on the physical characteristics sought.

In various embodiments, the diatomaceous earth is present in the friction material 10 in an amount of from about 1 to about 80, alternatively from about 2 to about 70, alternatively from about 3 to about 60, alternatively from about 4 to about 50, alternatively from about 5 to about 40, alternatively from about 10 to about 30, alternatively from about 15 to about 25, weight percent based on the total weight of the substrate material. In additional non-limiting embodiments, all values and ranges of values within and including the aforementioned range endpoints are hereby expressly contemplated.

In various embodiments, the friction particles 16 include graphite. In many such embodiments, the graphite is present in the friction material 10 in an amount of from about 1 to about 20, alternatively from about 2 to about 19, alternatively from about 3 to about 18, alternatively from about 4 to about 17, alternatively from about 5 to about 16, alternatively from about 6 to about 15, alternatively from about 7 to about 14, weight percent based on the total weight of the substrate material. In additional non-limiting embodiments, all values and ranges of values within and including the aforementioned range endpoints are hereby expressly contemplated.

In various embodiments, the friction particles 16 include silica. In many such embodiments, the silica is present in the friction material 10 in an amount of from about 1 to about 20, alternatively from about 2 to about 19, alternatively from about 3 to about 18, alternatively from about 4 to about 17, alternatively from about 5 to about 16, alternatively from about 6 to about 15, alternatively from about 7 to about 14, weight percent based on the total weight of the substrate material. In additional non-limiting embodiments, all values and ranges of values within and including the aforementioned range endpoints are hereby expressly contemplated.

In various embodiments, the friction particles 16 include particles derived from cashew nut shell oil, rubber, or combinations thereof. Friction particles 16 derived from cashew nut shell oil or comprising rubber are elastic and exhibit rubber-like properties. In this disclosure, friction particles 16 derived from cashew nut shell oil and/or rubber may also be referred to as elastomeric particles. In some embodiments, the friction particles 16 include rubber particles which are, include, comprise, consist essentially of, or consist of, silicone rubber, styrene butadiene rubber ("SBR"), butyl rubber, halogenated rubbers (e.g. chlorobutyl rubber, bromobutyl rubber, polychloroprene rubber, nitrile rubber), and combinations thereof. In many such embodiments, the particles derived from cashew nut shell oil, rubber, or combinations thereof are present in the friction material 10 in an amount of from about 1 to about 20, alternatively from about 2 to about 15, alternatively from about 3 to about 10, weight percent based on the total weight of the substrate material. In additional non-limiting embodiments, all values and ranges of values within and including the aforementioned range endpoints are hereby expressly contemplated.

In various embodiments, the friction particles 16 have an average diameter of from about 0.04 µm to about 80 µm, alternatively from about 1 µm to about 80 µm, alternatively from about 1 µm to about 60 µm, alternatively from about 1 µm to about 40 µm. In additional non-limiting embodiments, all values and ranges of values within and including the aforementioned range endpoints are hereby expressly contemplated.

The friction particles 16 affect the pore size of the friction material 10 and may also affect elasticity/compression. For example, the use of friction particles 16 derived from cashew nut shell oil and/or rubber may improve the elasticity and compression of the friction material 10. As another example, when the size of individual particles of the friction particles 16 is larger, the particles do not pack together as tightly when the friction material 10 is formed. This tends to lead to the formation of larger pore sizes. Conversely, when the size of the individual particles of the friction particles 16 is smaller, the particles pack together more tightly when the friction material 10 is formed. This tends to lead to the formation of smaller pore sizes.

In various embodiments, the friction particles 16 are present in an amount of from about 10 to about 85, alternatively from about 15 to about 75, alternatively from about 15 to about 70, alternatively from about 15 to about 65, alternatively from about 20 to about 60, alternatively from about 21 to about 39, alternatively from about 31 to about 39, weight percent based on the total weight of the substrate material. In additional non-limiting embodiments, all values and ranges of values within and including the aforementioned range endpoints are hereby expressly contemplated.

The amount of the friction particles 16 present in the friction material 10 may vary outside of the ranges above, but is typically both whole and fractional values within these ranges. Further, it is to be appreciated that more than one type of friction particle 16 may be included in the friction material 10, in which case the total amount of all the friction particles 16 present in the friction material 10 is within the above ranges.

A secondary, or top, friction generating layer of friction particles 16 may also be deposited on the friction generating surface 32 of the friction material 10. Various friction modifying particles, including diatomaceous earth, are useful as the secondary layer on the fibrous base material. In some embodiments, any combination of the friction particles 16 described above can be uniformly deposited on the friction generating surface 32 of the friction material 10 (or the substrate material) in an amount of from about 0.2 to about 20, alternatively from about 2 to about 10, alternatively from about 3 to about 5, weight percent based on the total weight of the substrate material. In additional non-limiting embodiments, all values and ranges of values within and including the aforementioned range endpoints are hereby expressly contemplated.

Additives:

The friction material 10 may also include one or more additives. Such additives can be chosen from the group of anti-foaming agents, processing additives, plasticizers, surface-active agents, adhesion promoters, flame retardants, anti-oxidants, water scavengers, colorants, dyes, ultraviolet light stabilizers, fillers, thixotropic agents, blowing agents, surfactants, inert diluents, and combinations thereof. The additive(s) may be included in any amount as desired by those of skill in the art. Of course the friction material 10 may be free of or substantially free of any of the aforementioned additives (include less than 5, 4, 3, 2, 1, 0.5, or 0.1 wt. %).

The Friction Material:

Referring now to FIG. 1, the friction material 10 presents the friction generating surface 32 and the bonding surface 34 facing opposite (and parallel to) the friction generating surface 32. The bonding surface 34 is typically adhered to the substrate 38 (e.g. the metal plate) and the friction generating surface 32 is used to generate friction.

Still referring to FIG. 1, the friction material 10 includes the organopolysiloxane resin 12, the plurality of fibers 14, and the plurality of friction particles 16. The composition and components of the friction material 10 are just as described above. The arrangement of the organopolysiloxane resin 12, the fibers 14, and the friction particles 16 typically define a plurality of pores 20 (or pores 20). That is, the friction material 10 is typically porous. For purposes of the present disclosure, the friction material 10 includes organopolysiloxane resin 12 (cured or uncured).

Friction materials 10 which include the fibers 14 and the friction particles 16, but do not include organopolysiloxane resin 12 are referred to as a substrate material. Once the organopolysiloxane resin 12 of the friction material 10 is cured, the friction material 10 is fit for use, e.g. on the friction plate 36.

The friction material 10 may be described as single-ply, meaning that it is a single layer and is not two-ply. In other words, the friction material 10 does not include two distinct layers as would be present in a two-ply structure. However, in some embodiments, the friction material 10 may be described as including a base and a deposit or friction generating layer.

For example, the friction material 10 can include the friction generating layer penetrating into and integral with said friction material 10 and presenting said friction generating surface 32 facing opposite said bonding surface of said base, said friction generating layer comprising (i) the fibers 14 (e.g. fibrillated nanofibers); and (ii) the friction particles 16 (e.g. diatomaceous earth particles and/or elastomeric particles).

The friction material 10 defines the pores 20, e.g. the plurality of pores 20. Each of the pores 20 has a pore size. The average, or mean, pore size is typically represented as a distribution. The pore size may be determined using ASTM D4404-10. In various embodiments, the median pore size, or alternatively the range of all pore sizes in the friction material 10, is from about 2 µm to about 100 µm, alternatively from about 5 µm to about 100 µm, alternatively 0.5 µm to about 50 µm, alternatively from about 1 µm to about 50 µm, alternatively from about 1 µm to about 25 µm, alternatively from about 1 µm to about 15 µm, alternatively from about 15 µm to about 40 µm, alternatively from about 20 µm to about 35 µm, alternatively from about 25 µm to about 30 µm, alternatively from about 30 µm to about 35 µm, alternatively from about 5 µm to about 15 µm, alternatively from about 5 µm to about 10 µm, alternatively from about 10 µm to about 15 µm, alternatively from about 10 µm to about 20 µm, alternatively from about 5 µm to about 20 µm, alternatively from about 5 µm to about 7 µm, alternatively from about 4 µm to about 8 µm, alternatively from about 5 µm to about 8 µm, alternatively from about 7 µm to about 10 µm, alternatively from about 7 µm to about 15 µm, as determined using ASTM D4404-10. In various embodiments, the median pore size, or alternatively the range of all pore sizes in the friction material 10, is greater than about 1, 2, 3, 4, 5, 6, 7 8, 9, 10, 1, 12, 13 14, 15, 16, 17, 18, 19, or 20 and less than 50, µm. In additional non-limiting embodiments, all values and ranges of values within and including the aforementioned range endpoints are hereby expressly contemplated.

In other embodiments, the friction material 10 has a porosity of from about 25% to about 85% as determined using ASTM D4404-10. The porosity of the friction material 10 can be alternatively described as a percentage of the total friction material 10 that is open to air or the percentage of the total friction material 10, based on volume, that is air or not solid. In various embodiments, the friction material 10 has a porosity of from about 25 to about 80, alternatively from about 35 to about 80, alternatively from about 25 to about 70, alternatively from about 35 to about 70, alternatively from about 45 to about 85, alternatively from about 45 to about 75, alternatively from about 55 to about 85, alternatively from about 55 to about 75, alternatively from about 60 to about 80, alternatively from about 60 to about 75, alternatively from about 60 to about 70, alternatively from about 60 to about 65, alternatively from about 65 to about 85, alternatively from about 65 to about 75, alternatively from about 65 to about 70, alternatively from about 70 to about 85, alternatively from about 70 to about 80, alternatively from about 70 to about 75, alternatively from about 75 to about 85, alternatively from about 75 to about 80, alternatively from about 80 to about 85, %, as determined using ASTM D4404-10. In additional non-limiting embodiments, all values and ranges of values within and including the aforementioned range endpoints are hereby expressly contemplated.

The more porous the structure of the friction material 10, the more efficiently heat is dissipated. The oil flow in and out of the friction material 10 during engagement of the friction material 10 during use occurs more rapidly when the friction material 10 is porous. For example, when the friction material 10 has a higher mean flow pore diameter and porosity, the friction material 10 is more likely to run cooler or with less heat generated in the transmission 42 due to better automatic transmission fluid flow throughout the pores 20 of the friction material 10. During operation of a transmission system, oil deposits on the friction material 10 tend to develop over time due to a breakdown of automatic transmission fluid, especially at high temperatures. The oil deposits tend to decrease the size of the pores 20. Therefore, when the friction material 10 is formed with larger pores 20, the greater the remaining/resultant pore size after oil deposit. Porosity of the friction material 10 may be further modified based on choice of fibers type and size, friction particle type and size, and substrate material thickness and weight.

In various embodiments, the friction material 10 may have high porosity such that there is a high fluid permeation capacity during use. In such embodiments, it may be important that the friction material 10 not only be porous, but also be compressible. For example, the fluids permeated into the friction material 10 typically must be capable of being squeezed or released from the friction material 10 quickly under the pressures applied during operation of the transmission 42, yet the friction material 10 typically must not collapse.

In various embodiments, the friction material 10 has a density of from about 0.4 to about 1.5, alternatively from about 0.4 to about 1.0, alternatively from about 0.4 to about 1.0, alternatively from about 0.4 to about 0.8, g/cm$^3$, alternatively from about 0.5 to about 0.8, g/cm$^3$. In such embodiments, the total thickness of the friction material 10 is typically from about 0.3 mm to about 1 mm, e.g. 0.3 to 0.9, 0.4 to 0.8, 0.5 to 0.7, 0.6 to 0.7, less than about 0.5 mm, alternatively from about 0.3 mm to about 5 mm, alternatively from about 0.3 mm to about 3 mm, alternatively from about 0.3 mm to about 2 mm, alternatively from about 0.31 to about 0.39, alternatively from about 0.32 to about 0.38, alternatively from about 0.33 to about 0.37, alternatively from about 0.34 to about 0.36, alternatively from about 0.34, mm. In additional non-limiting embodiments, all values and ranges of values within and including the aforementioned range endpoints are hereby expressly contemplated. This thickness may refer to a thickness prior to, or after, inclusion of the organopolysiloxane resin 12.

In various embodiments, the friction material 10 exhibits improved anti-shudder characteristics along with improved elasticity/compression and/or porosity which allows for more uniform heat dissipation during use. Fluids in transmissions 42 can rapidly move through the pores 20 of the friction material 10. Further, improved elasticity/compression and/or porosity provides more uniform pressure or even pressure distribution on the friction material 10 such that uneven lining wear or "hot spots" are minimized.

Compression of the friction material 10 may be further modified based on choice of the fibers 14, the friction particles 16, the organopolysiloxane resin 12, and substrate material weight and thickness. In additional non-limiting embodiments, all values and ranges of values within and including the aforementioned range endpoints are hereby expressly contemplated.

The friction material 10 of this disclosure, e.g. when used to form the friction plate 36, typically exhibits a dynamic coefficient of friction ("COF"), e.g. from about 0.10 to about 0.16, alternatively from about 0.11 to about 0.15, alternatively from about 0.12 to 0.14, alternatively from about 0.12 to about 0.13, as determined using the test described below and the torque curve generated therefrom, as is appreciated by those of skill in the art. In various embodiments, the friction material 10 exhibits a steady or gradually decreasing torque curve over time, especially at lower speeds, as will be understood by those of skill in the art. In additional non-limiting embodiments, all values and ranges of values within and including the aforementioned range endpoints are hereby expressly contemplated.

COF testing is conducted on a SAE no. 2 machine and/or GK 3 test bench. Four double-sided friction plates 36 and the corresponding application DCT fluid are used to simulate the operating environment of a dual-clutch transmission 42 at vehicle launch at interface temperatures up to about 440° C.

In various embodiments, the friction material 10 typically has a shear strength of greater than about 2,250, alternatively greater than about 2,500, alternatively from about 2,000 to about 10,000, alternatively from about 2,000 to about 8,000, alternatively from about 2,000 to about 5,000, alternatively from about 2,000 to about 4,000, alternatively from about 3,000 to about 5,000, alternatively from about 3,000 to about 4,000, kPa when tested in accordance with ASTM D3528-96. Regarding ASTM D3528-96, the test method is a double lap shear test performed on dry friction material 10 in ambient air with a total sample shear area of 4 in$^2$.

Figure 2:
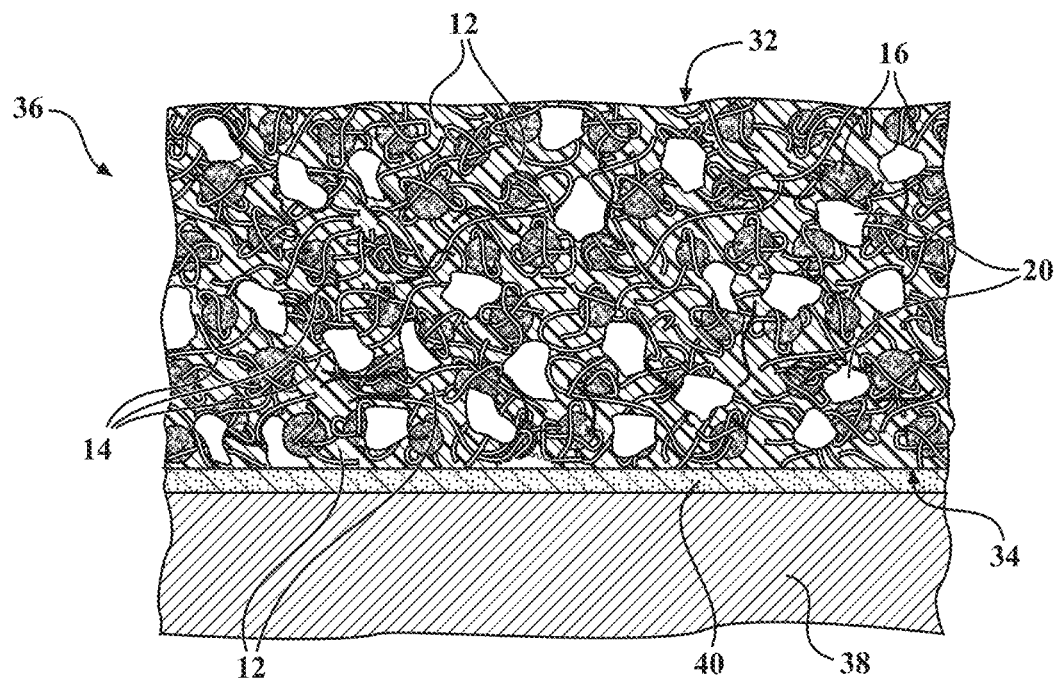
FIG. 2 is an enlarged cross-sectional view of a friction plate including the friction material of FIG. 1 and a substrate.
Figure 3:
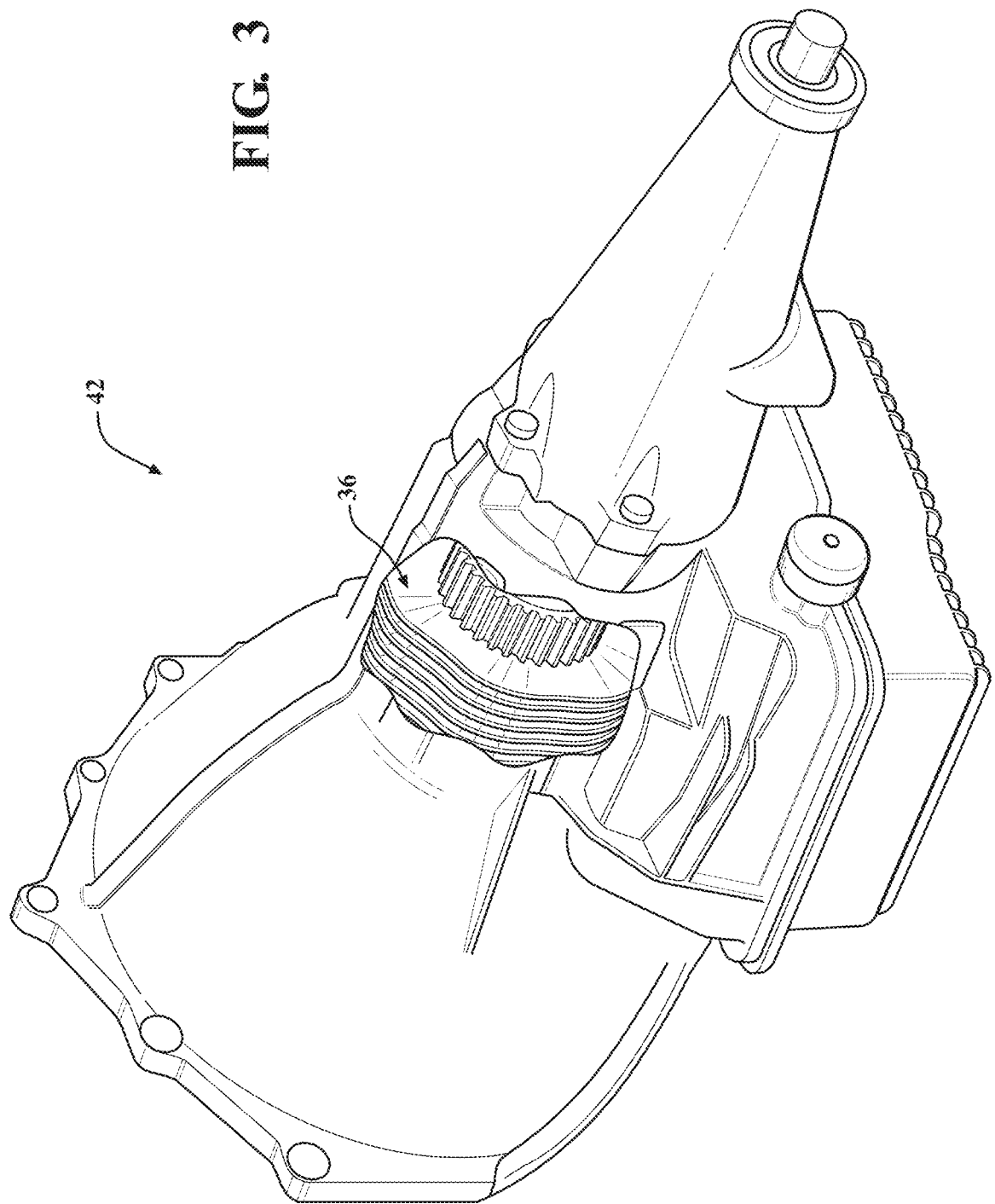
FIG. 3 is a perspective view of a transmission having a cut-out showing a clutch assembly including the friction plate of FIG. 2.

Friction Plate:

Referring now to FIG. 2, the disclosure also provides the friction plate 36 that includes the substrate 38 (e.g. a metal plate) and the friction material 10 as first introduced above. The substrate 38 has (at least) two surfaces and the friction material 10 is typically bonded to one or both of these surfaces. Typically, the friction plate 36 is formed once the friction material 10 is adhered or bonded to one or both surfaces. The bonding or adherence of the friction material 10 to one or both surfaces may be achieved by the bonding adhesive 40 as is known in the art, e.g. a phenolic organopolysiloxane resin 12 or any organopolysiloxane resin 12 described above. This disclosure also provides a clutch assembly that includes the friction plate 36 and a separator plate, as would be chosen by one of skill in the art. This disclosure also provides the transmission 42 that includes the clutch assembly. FIG. 3 is a perspective view of the transmission 42 having a cut-out showing the clutch assembly. The transmission 42 may be an automatic transmission 42 or a manual transmission 42.

Referring again to FIG. 2, the friction plate 36 includes the friction material 10, which is cured (i.e., including cured organopolysiloxane resin 12) bonded to the substrate 38 with the bonding adhesive 40 as is known in the art. The bonding surface 34 of the friction material 10 is where bonding to the substrate 38 or other material is meant to be accomplished. As such, the bonding surface 34 of the friction material 10 is bonded to the substrate 38.

The friction material 10 is bonded to the substrate 38 by any suitable technique known to skilled artisans. Typically, the friction material 10 is bonded to the substrate 38 with the bonding adhesive 40, which is generally known to those skilled in the art, e.g. with the bonding adhesive 40 comprising phenolic modified nitrile rubber. Exemplary substrates 38 include, but are not limited to, friction/clutch plates, synchronizer rings, and transmission bands. The substrate 38 is typically metal.

As alluded to above, the various embodiments of the friction material 10 described herein may be used in a wet clutch. The friction generating surface 32 of the friction material 10 experiences interfacial frictional engagement with an opposed mating surface (not shown) in the presence of a lubricant. The friction generating surface 32 experiences select interfacial frictional engagement with an opposed, rotating surface (not shown) in the presence of a lubricant, and the bonding surface 34 achieves bonded attachment to the substrate 38 with the aid of the bonding adhesive 40 or some other suitable bonding technique. The lubricant may be any suitable lubricating fluid such as, for example, an automatic transmission fluid. While the friction material 10 performs satisfactorily in a wet clutch designed to maintain a temperature at the friction generating surface 32 below about 350° C., it may also be used in higher temperature environments above about 350, alternatively about 400, alternatively about 450, ° C. if desired.

In many embodiments, the friction material 10 of this disclosure, e.g. when used to form the friction plate 36, has a final lining thickness after curing of the organopolysiloxane resin 12 and bonding to the metal plate, of from 0.4 to 1.2 mm. In other embodiments, this thickness is from about 0.5 to about 1.1, from about 0.6 to about 1, from about 0.7 to about 0.9, or from about 0.8 to about 0.9, mm. In additional non-limiting embodiments, all values and ranges of values within and including the aforementioned range endpoints are hereby expressly contemplated.

In various embodiments, the friction material 10/friction plate 36 exhibits a percent compression from about 10 to about 30 percent or from about 10 to about 20 percent, e.g. from about 11 to about 19, from about 12 to about 18, from about 13 to about 17, from about 14 to about 16, or about 15, percent, as determined after measuring the thickness of the fibers and the friction particles 16 (without organopolysiloxane resin 12; also known as "substrate material") before bonding to the substrate 38 as compared to the thickness of the friction material 10 (including the cured organopolysiloxane resin 12) after bonding to the substrate 38, as is understood by those of skill in the art. In additional non-limiting embodiments, all values and ranges of values within and including the aforementioned range endpoints are hereby expressly contemplated.

Method of Forming the Friction Material:

This disclosure also provides a method of forming the friction material 10. The method includes the steps of: providing the organopolysiloxane resin 12; providing a plurality of fibers 14 having a degree of fibrillation as measured according to Canadian Standard Freeness ("CSF") of from about 300 to about 800; providing the plurality of friction particles 16; providing the organopolysiloxane resin 12; combining the plurality of fibers 14, and the friction particles 16 to form a substrate material; impregnating the substrate material with the organopolysiloxane resin 12; and curing the organopolysiloxane resin 12 to form the friction material 10. The organopolysiloxane resin 12, the fibers 14, the friction particles 16, and all of the other components are just as described above.

In a typical embodiment, the friction material 10 is produced via a continuous manufacturing process on a manufacturing line. During the continuous manufacturing process, the fibers 14, the friction particles 16, and all other components are combined to form substrate material having a desired width and thickness. The substrate material is moved along the manufacturing line and saturated with the organopolysiloxane resin 12. Once saturated with the organopolysiloxane resin 12, the substrate material is pulled through rollers which compress the fibrous web to desired thickness and squeeze out extra organopolysiloxane resin 12 to form the friction material 10. The friction material 10 exits the rollers and is conveyed through a series of ovens which remove water and cure the friction material 10. The friction material 10, which includes cured organopolysiloxane resin 12, is then rolled and typically stored for later use.

In such an embodiment, throughout the continuous manufacturing process, the fibrous substrate material must support itself because it is moved along the manufacturing line (e.g. between belts, rollers, ovens, etc.) while suspended in air in an unsupported manner (e.g. pulled through the air rather than conveyed on a conveyor). In various other embodiments, the method further includes the step of optionally applying additional fibers 14 and friction particles 16 to the friction material 10 to form a deposit (or friction generating layer) on the friction generating surface 32.

In various embodiments, the friction material 10 may be impregnated with the organopolysiloxane resin 12 and then heated to a desired temperature for a predetermined length of time to form the friction material 10 (e.g. to cure the organopolysiloxane resin 12). In many embodiments, the heating cures the organopolysiloxane resin 12 (e.g. a silicone resin) at a temperature of from about 170 to about 380° C. Thereafter, the impregnated and cured friction material 10 may be adhered to the desired substrate 38 by suitable means.

The following examples are intended to illustrate the present invention and are not to be viewed in any way as limiting to the scope of the present invention.

EXAMPLES

Examples 1 and 2 are friction materials comprising an organopolysiloxane resin representative of this disclosure, and Comparative Examples 1-4 comprise comparative resins which are different than the organopolysiloxane resin of this disclosure. The only compositional difference between the friction materials of Examples 1 and 2 and Comparative Examples 1-4 is the resin type. Examples 1 and 2 and Comparative Examples 1-4 are generally described in Table 1 below.

TABLE 1

| | Substrate Material | Resin Type | Resin Amount* |
|---|---|---|---|
| Example 1 | A** | methyl organopolysiloxane resin | 30-70 |
| Example 2 | A | phenyl methyl organopolysiloxane resin (silsesquioxane) | 30-70 |
| Comparative Example 1 | A | phenolic resin | 30-70 |
| Comparative Example 2 | A | resin comprising polysiloxane and polyimide | 30-70 |
| Comparative Example 3 | A | organopolysiloxane resin which is different than the organopolysiloxanes of Examples 1 and 2 | 30-70 |
| Comparative Example 4 | A | phenyl organopolysiloxane resin | 30-70 |

*weight percent based on the total weight of the substrate material.
**Substrate Material A can be utilized to make friction material for a high energy shifting clutch.

Figure 4:
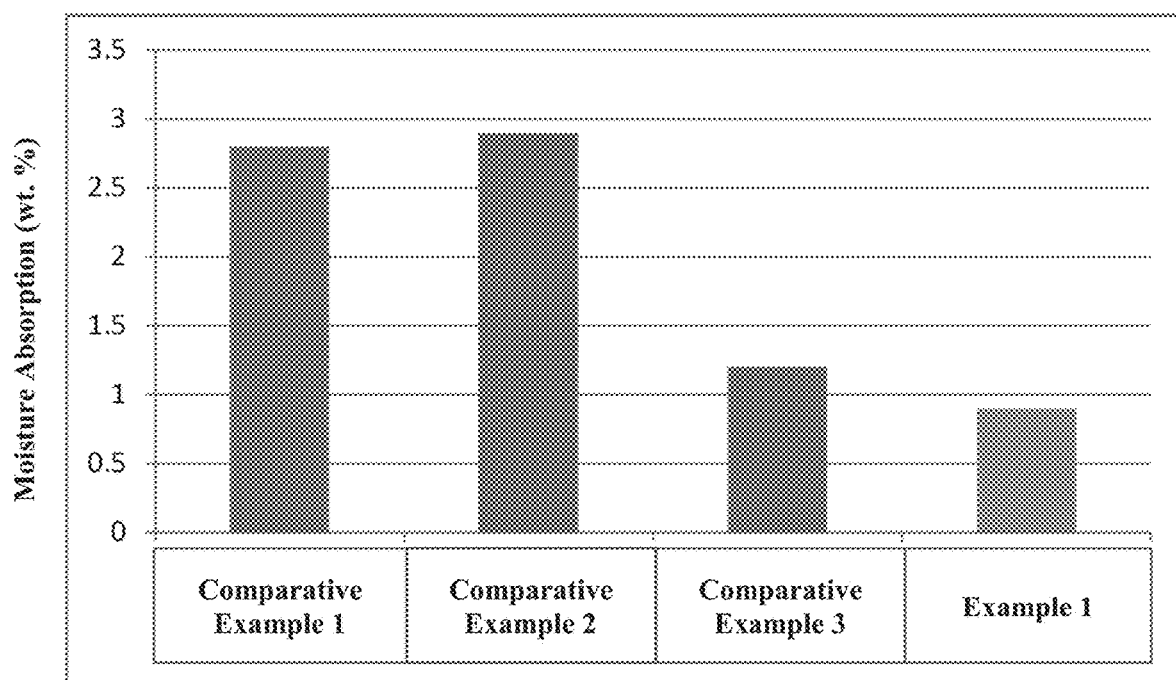
FIG. 4 is a bar graph which shows the water absorption (wt. %) of the friction material including the organopolysiloxane resin.

Referring now to FIG. 4, the water absorption of the friction materials of Example 1 and Comparative Examples 1-3 is set forth. To measure water absorption, a sample of each of the respective friction materials is dried in an oven at 150° C. for 3 hours and weighed. Once dried, the sample is aged in a 90% humidity chamber at a temperature of 23° C. After humidity aging, the sample is weighed and water absorption is determined by calculating the % by weight increase between the sample after drying and the same sample after humidity aging. The friction material of Example 1, which includes a methyl organopolysiloxane resin, absorbs less water than the friction material of Comparative Example 1, which includes a phenolic resin (as is traditionally used in such friction materials). Further, the friction material of Example 1, which includes a methyl organopolysiloxane resin, absorbs less water than the friction material of Comparative Example 2, which includes a resin comprising organopolysiloxane and polyimide. Unexpectedly, Example 1, which includes a methyl organopolysiloxane resin, absorbs less water than the friction material of Comparative Example 3, which includes an organopolysiloxane resin of a different structure than the methyl organopolysiloxane resin of Example 1.

Figure 5:
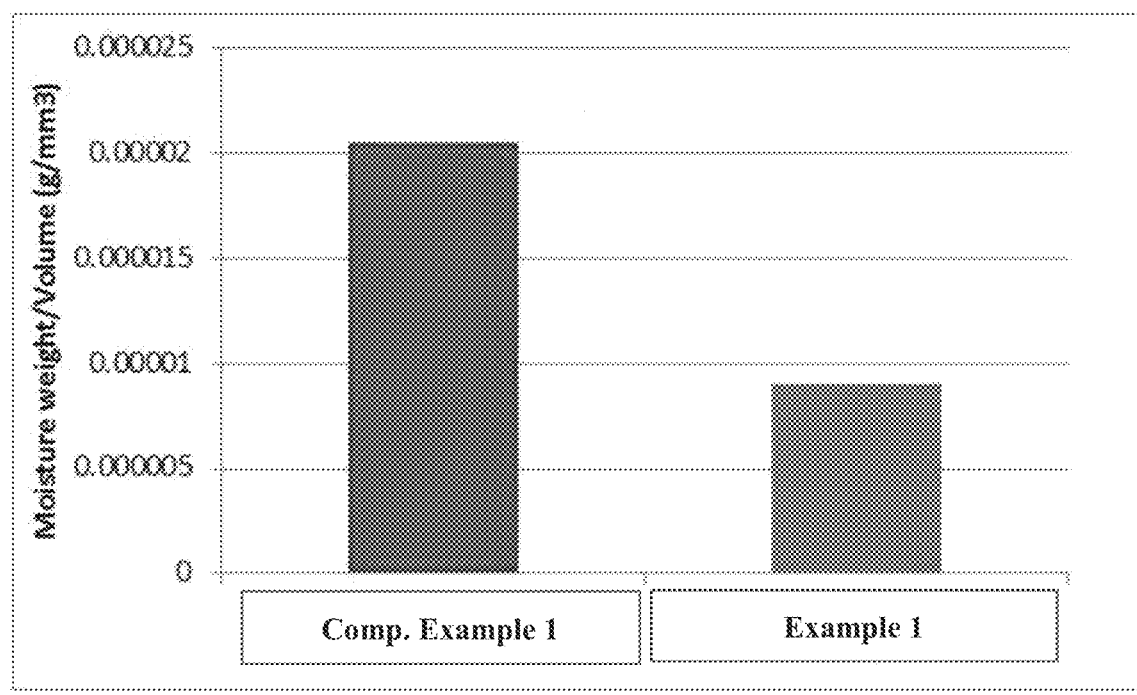
FIG. 5 is a bar graph which shows the water absorption (wt./unit volume) of the friction material including the organopolysiloxane resin.

Example 1 is a friction material comprising an organopolysiloxane resin representative of this disclosure, and Comparative Example 1 comprises a phenolic resin. The only compositional difference between the friction materials of Example 1 and Comparative Example 2 is the resin type. Example 1 and Comparative Example 1 are generally described in Table 1 above. The water absorption of the friction material of Example 1 and Comparative Example 1 is tested and the results are set forth in FIG. 5. To test water absorption, a sample of friction material is dried in an oven at 150° C. for 3 hours and weighed. Once dried, the sample is aged in a 90% humidity chamber at a temperature of 23° C. After humidity aging, the sample is weighed and water absorption is reported via weight per unit volume (as opposed to wt. % which is shown in FIG. 4). Referring now to FIG. 5, the friction Material of Example 1 absorbs less than half of the moisture absorbed by Comparative Example 1. Advantageously, the friction material of Example 1 exhibits minimal water absorption.

Figure 6:
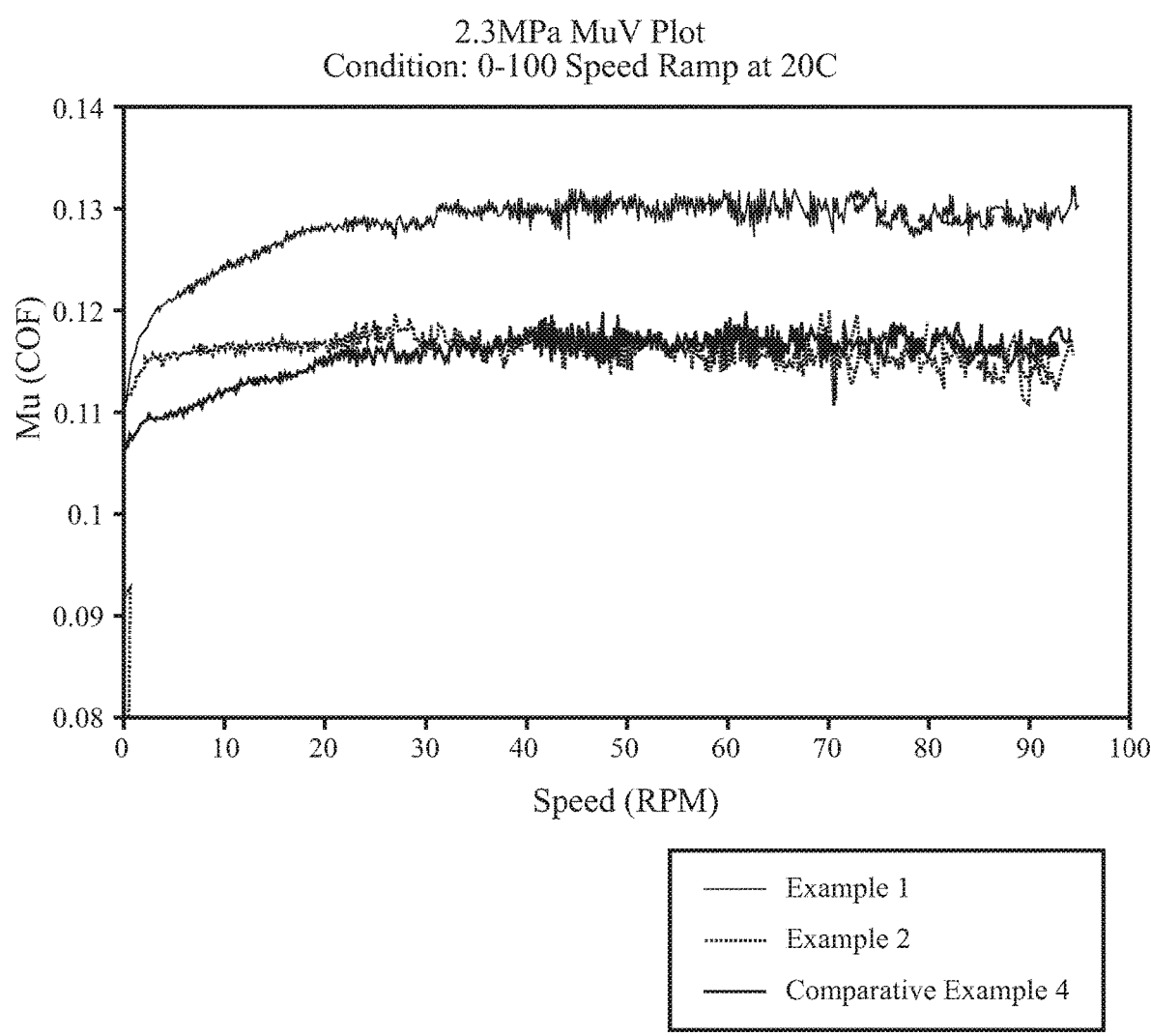
FIG. 6 is a graph of COF at different speeds up to 100 rpm of the friction material including the organopolysiloxane resin.
Figure 7:
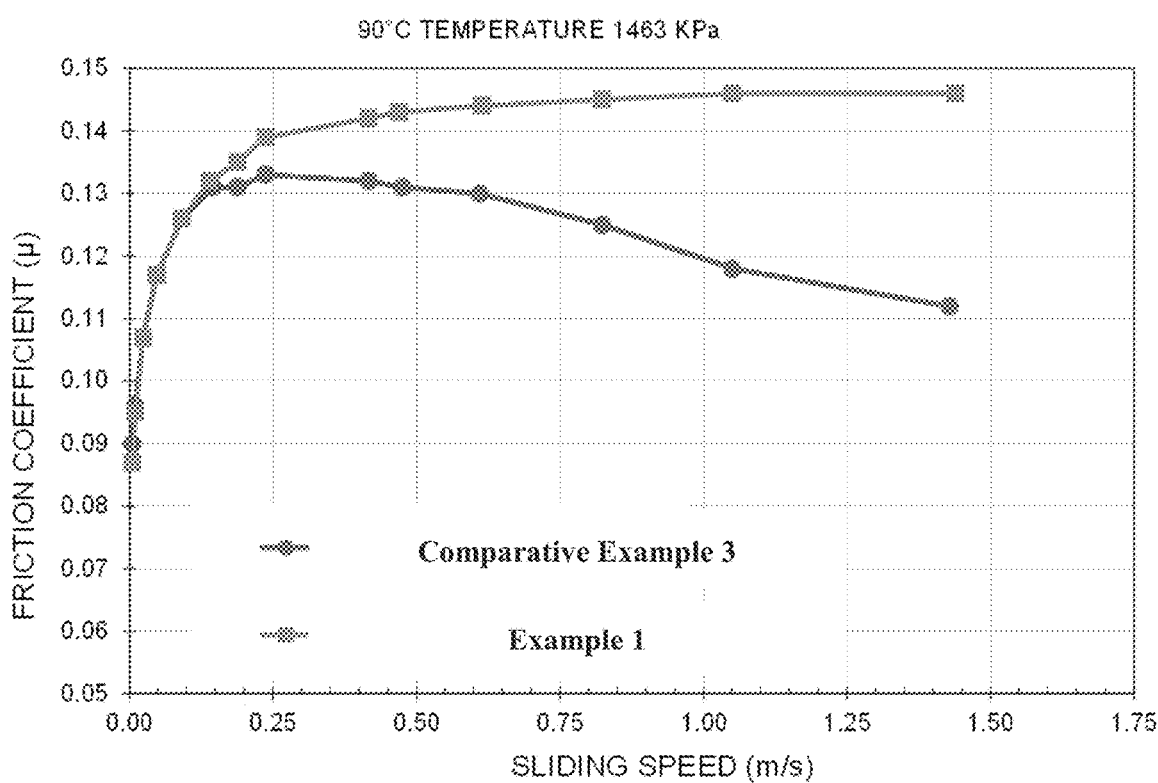
FIG. 7 is a graph of COF at high temperature over at different speeds up to 1.5 m/s of the friction material including the organopolysiloxane resin.

Referring now to FIGS. 6 and 7, the coefficient of friction ("COF") of the friction materials of Examples 1 and 2 and Comparative Examples 3 and 4 is tested on a SAE no. 2 machine. One double-sided friction plate and transmission fluid is used to simulate the operating environment of a low speed slipping clutch condition. The COF of Examples 1 and 2 and Comparative Example 4 is set forth in FIG. 6. In FIG. 6, the friction material of Example 1, which includes a methyl organopolysiloxane resin, demonstrates more positive and higher COF over Example 2, which includes a phenyl methyl organopolysiloxane resin. Further, both Examples 1 and 2 demonstrate better COF in low speed area over Comparative Example 4, which includes a phenyl organopolysiloxane resin. Without being bound by theory, it is believed COF of friction materials improve as the methyl content an organopolysiloxane resin included therein increases, i.e., that branched organopolysiloxane resins having R groups which are predominately methyl (as described in Examples 1 and 2 and the specification above) unexpectedly demonstrate excellent COF.

Referring now to FIG. 7, Example 1 demonstrates more positive and higher COF at higher temperatures than Comparative Example 3, which includes an organopolysiloxane resin which is different than the methyl organopolysiloxane resin of Example 1.

Example 3 is a friction material comprising an organopolysiloxane resin representative of this disclosure, and Comparative Example 5 comprises a phenolic resin. The only compositional difference between the friction materials of Example 3 and Comparative Example 5 is the resin type. Example 3 and Comparative Example 5 are generally described in Table 2 below.

TABLE 2

| | Substrate Material | Resin Type | Resin Amount* |
|---|---|---|---|
| Example 3 | C** | methyl organopolysiloxane resin | 30-70 |
| Comparative Example 5 | C | phenolic resin | 30-70 |

*weight percent based on the total weight of the substrate material.
**Substrate Material C is described in U.S. Pat. No. 9,777,785, which is incorporated herein by reference.

Figure 8:
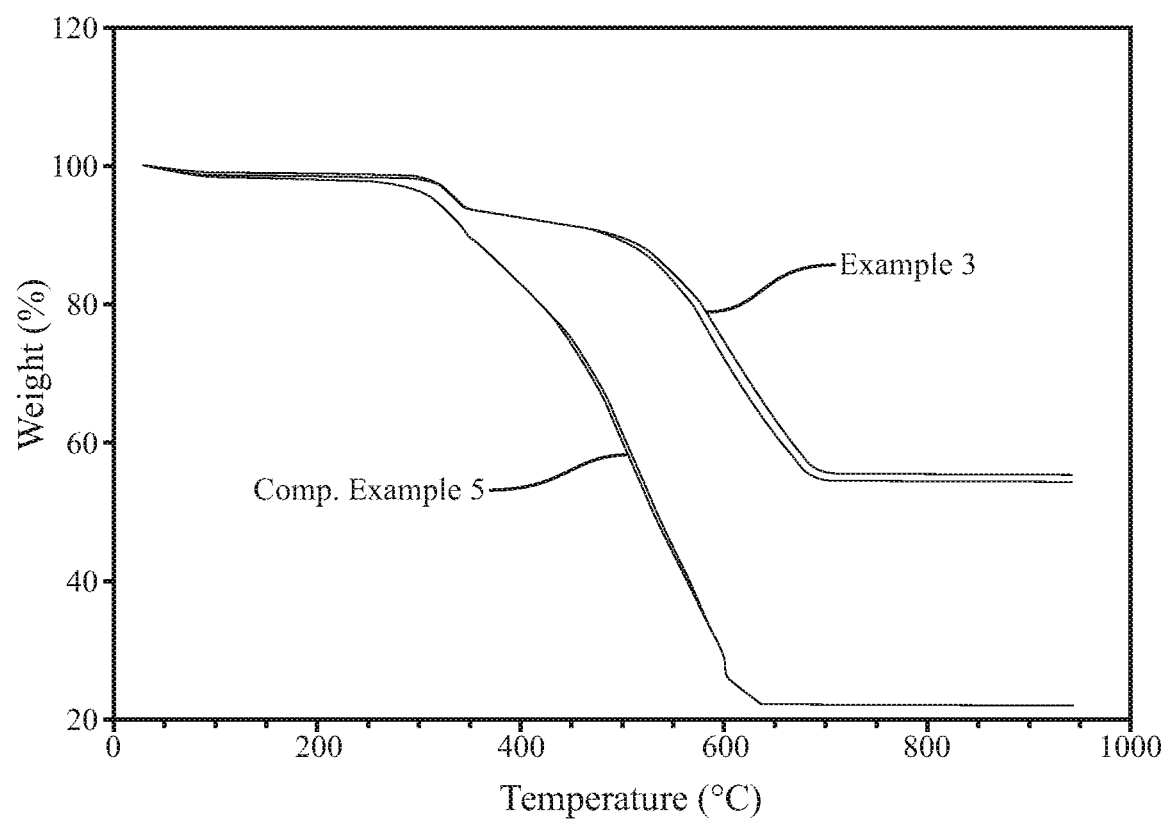
FIG. 8 is a thermogravimetric analysis of the friction material including the organopolysiloxane resin.

The thermal stability of Example 3 and Comparative Example 5 is tested via thermos gravimetric analysis (TGA) at a temperature ramp of 20° C./min. As is shown in FIG. 8, Example 3 exhibits a thermal decomposition temperature of greater than 350° C., and also exhibits better thermal stability at higher temperatures than Comparative Example 5.

Figure 9:
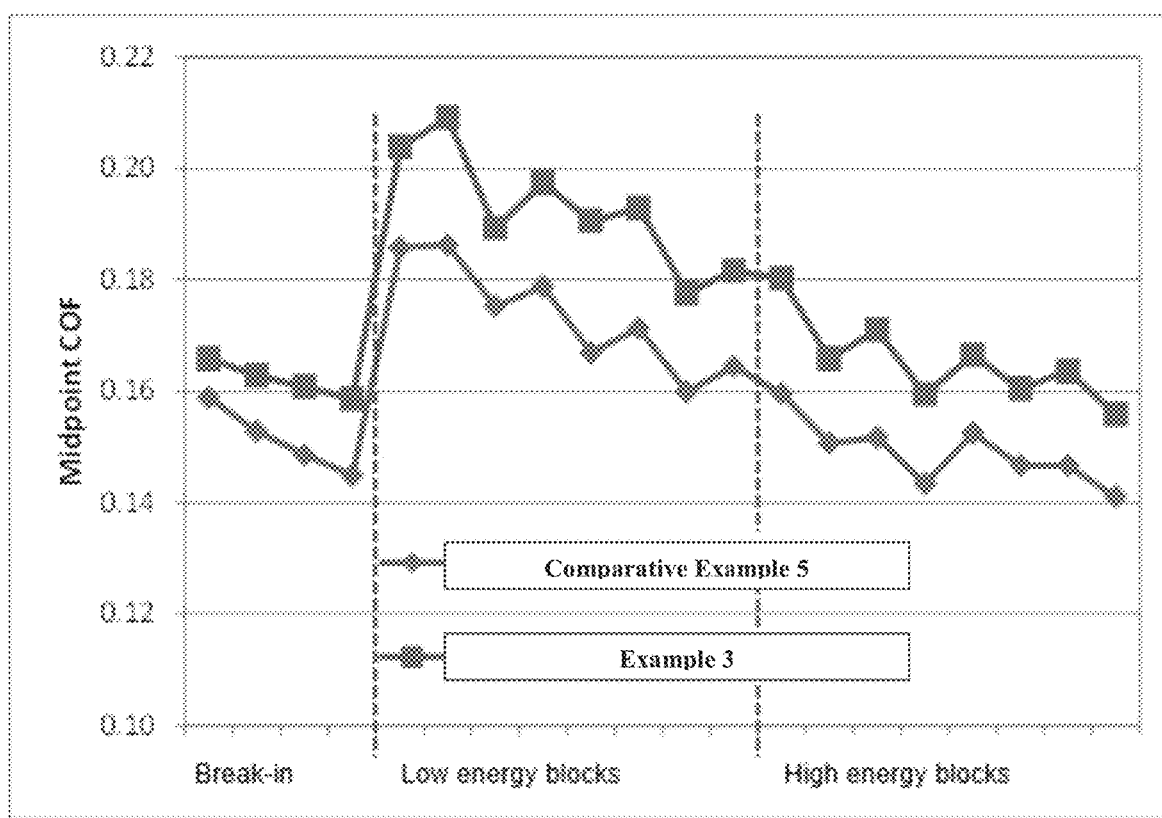
FIG. 9 is a graph of dynamic COF over a number of engagement/disengagement cycles of an embodiment of the friction material including the organopolysiloxane resin.

Measurements for Initial COF, Dynamic COF, Static COF, and E/M Ratio were plotted against the number of friction material engagement/disengagement cycles. The dynamic COF of Example 3 and Comparative Example 5 is set forth in FIG. 9. In FIG. 9, Example 3 demonstrates improved or higher dynamic COF over Comparative Example 5.

Example 4 is a friction material comprising an organopolysiloxane resin representative of this disclosure, and Comparative Example 6 comprises a phenolic resin. The only compositional difference between the friction materials of Example 4 and Comparative Example 6 is the resin type. The friction material of Example 4 and Comparative Example 6 includes a combination of: (1) aramid pulp having a diameter of from about 2 to about 50 μm and a length of from about 3 to about 15 mm; and (2) aramid floc having a diameter of from about 2 to about 50 μm and a length of no greater than about 3 mm. Example 4 and Comparative Example 6 are generally described in Table 3 below.

TABLE 3

| | Substrate Material | Resin Type | Resin Amount* |
|---|---|---|---|
| Example 4 | E** | methyl organopolysiloxane resin | 30-70 |
| Comparative Example 6 | E | phenolic resin | 30-70 |

*weight percent based on the total weight of the substrate material.
**Substrate Material E is described in PCT Publication No. WO 2017/117038, which is incorporated herein by reference.

Figure 10:
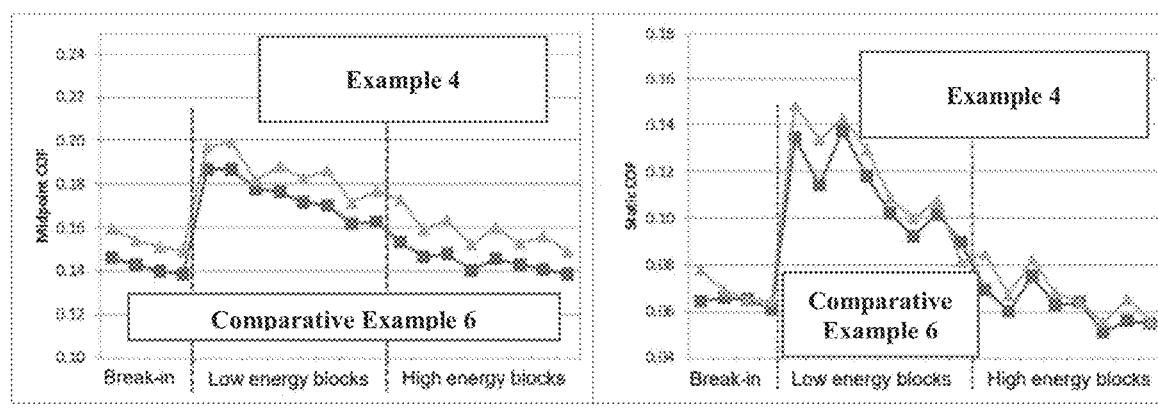
FIG. 10 is a graph of dynamic COF over a number of engagement/disengagement cycles of the friction material including the organopolysiloxane resin.

The dynamic and static COF of the Example 4 and Comparative Example 6 is set forth in FIG. 10. In FIG. 10, Example 4 demonstrates improved dynamic and static COF over the Comparative Example 6.

Figure 11:
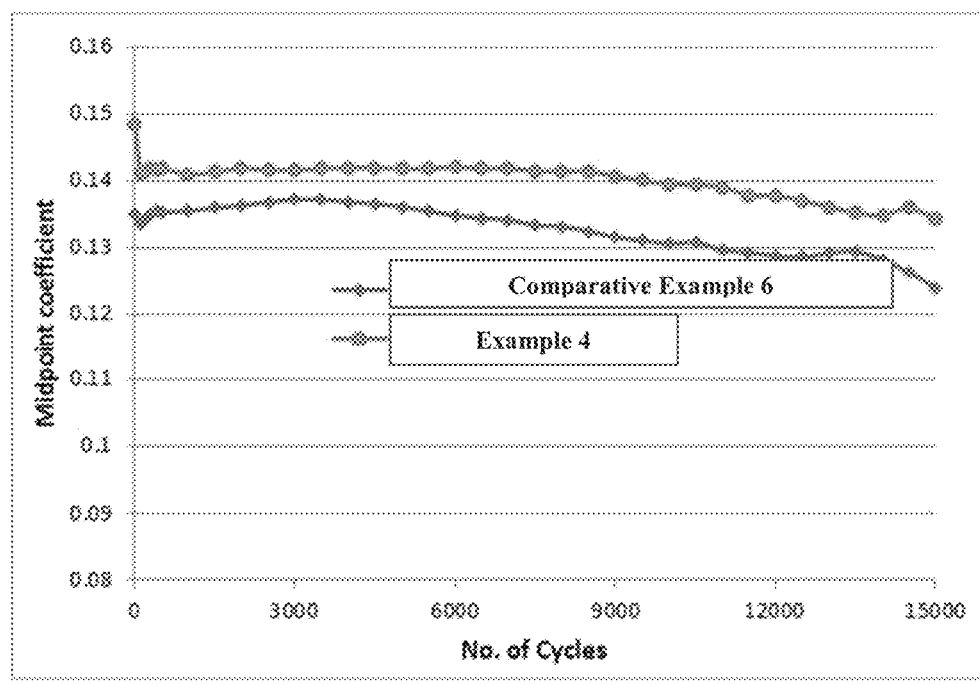
FIG. 11 is a durability graph of COF over a number of engagement/disengagement cycles of an embodiment of the friction material including the organopolysiloxane resin.

Durability testing was conducted on Example 4 and Comparative Example 6 on a GK3 test bench. The durability of Example 4 and Comparative Example 6 is set forth in FIG. 11. More specifically, measurements for Midpoint COF were plotted against the number of friction material engagement/disengagement cycles. Example 4 exhibited and maintained a higher COF throughout the testing. As such, the friction material of Example 4 demonstrates improved friction and durability characteristics.

Example 5 is a friction material comprising an organopolysiloxane resin representative of this disclosure, and Comparative Example 7 comprises a phenolic resin. The only compositional difference between the friction materials of Example 5 and Comparative Example 7 is the resin type. The friction materials of Example 5 and Comparative Example 7 include a deposit or friction generating layer. Example 5 and Comparative Example 7 are generally described in Table 4 below.

TABLE 4

| Substrate Material | Component | Example 5 | Comparative Example 7 |
|---|---|---|---|
| D* | Fibers A and B | 40-60 wt. % | 40-60 wt. % |
|  | Friction Particles A and B | 35-55 wt. % | 35-55 wt. % |
| Friction Generating Layer | Friction Particles C | 10-20 lbs/ 3000 ft$^2$ | 10-20 lbs/ 3000 ft$^2$ |
|  | Fibers C | 2-5 lbs/ 3000 ft$^2$ | 2-5 lbs/ 3000 ft$^2$ |
| Curable Resin | Methyl organopolysiloxane Resin | 23-70 | — |
|  | Phenolic Resin | — | 23-70 |

*Substrate material D is described in PCT Publication No. WO 2017/100001, which is incorporated herein by reference.

Fibers A, B, and C comprise aramid, natural cellulose, and lyocell cellulose, respectively.

Friction Particles A, B, and C comprise diatomaceous earth, graphite, and diatomaceous earth having a Mohs hardness of from about 5.5 to about 6.

Figure 12:
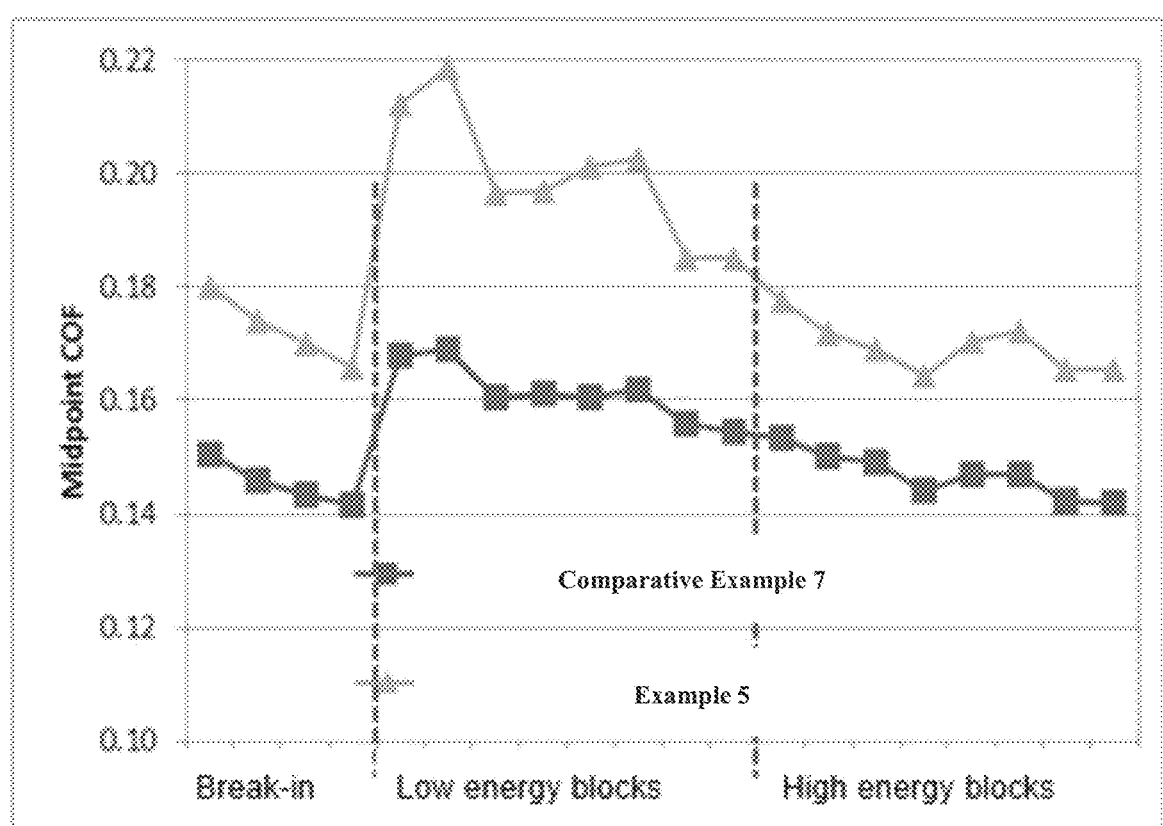
FIG. 12 is a graph of dynamic COF over a number of engagement/disengagement cycles of the friction material including the organopolysiloxane resin.

Measurements for Initial COF, Dynamic COF, Static COF, and E/M Ratio were measured on a SAE no. 2 machine and were plotted against the number of friction material engagement/disengagement cycles. The dynamic COF of the Example 5 and Comparative Example 7 is set forth in FIG. 12. In FIG. 12, Example 5 demonstrates improved dynamic COF over Comparative Example 7.

Referring now to Table 5 below, the improvement (% increase) in dynamic COF of Example 5 over Comparative Example 7 is set forth below.

TABLE 5

| The Improved Friction Properties of Example 5 | | |
|---|---|---|
|  | Dynamic COF | |
| Transmission Fluid | Low Energy | High Energy |
| Fuchs Titan DCT Fluid 52595 | 23 | 16 |

Referring now to Table 5, Example 5, which includes the organopolysiloxane resin, demonstrates improved dynamic and static COF over the Comparative Example 7, which includes a phenolic resin.

In summary, Examples 1-5 which comprise organopolysiloxane resin, demonstrate the following physical properties:
Low moisture absorption;
High temperature resistance;
High dynamic and static COF;
Durability; and
Glaze resistance.

Notably, Examples 1-5, which comprise organopolysiloxane resin, demonstrate better physical properties than the corresponding comparative examples which differ only in resin type.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements selected and combined from any portion of the disclosure.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A friction material presenting a friction generating surface and a bonding surface facing opposite said friction generating surface, said friction material comprising the cured product of:
   (A) a friction generating layer presenting said friction generating surface facing opposite said bonding surface, said friction generating layer comprising:
      (i) a plurality of fibers; and
      (ii) a plurality of friction particles; and (B) a base layer comprising:
(i) a plurality of fibers having a degree of fibrillation as measured according to Canadian Standard Freeness ("CSF") of from about 300 to about 800;
(ii) a plurality of friction particles; and
(iii) an organopolysiloxane resin comprising siloxy units independently represented by the following formula: $(R_1SiO_{3/2})$ and/or $(R_2SiO_{2/2})$; wherein each $R_1$ and $R_2$ is independently selected from a monovalent hydrocarbon group having from 1 to 20 carbon atoms.

2. A friction material as set forth in claim 1 wherein each $R_1$ and $R_2$ is independently selected from a methyl, an ethyl, a propyl, a butyl, a hexyl, an octyl, a decyl, a cyclohexyl, a phenyl, a tolyl, a xylyl, a benzyl, and a phenylethyl group.

3. A friction material as set forth in claim 1 wherein said organopolysiloxane resin comprises end groups selected from [—OH], [—OCH$_3$], and [—OC$_2$H$_5$].

4. A friction material as set forth in claim 1 wherein said organopolysiloxane resin is a silsesquioxane comprising siloxy units independently represented by the formula:

$(R_1SiO_{3/2})$;

wherein each $R_1$ is selected from methyl and phenyl groups.

5. A friction material as set forth in claim 4 wherein said organopolysiloxane resin comprises $R_1$ methyl groups and $R_1$ phenyl groups in a ratio of from about 1:1 to about 1:3.

6. A friction material as set forth in claim 4 wherein each $R_1$ is a methyl group.

7. A friction material as set forth in claim 1 wherein said organopolysiloxane resin comprises siloxy units independently represented by the following formulas:

$(R_1SiO_{3/2})$ and $(R_2SiO_{2/2})$, wherein each $R_1$ and $R_2$ is independently selected from an alkyl group, a cycloaliphatic group, or an aralkyl group.

8. A friction material as set forth in claim 7 wherein each $R_1$ and $R_2$ is a methyl group.

9. A friction material as set forth in claim 1 wherein said organopolysiloxane resin has a decomposition temperature of greater than about 350° C.

10. A friction material as set forth in claim 1 wherein said organopolysiloxane resin has a SiO$_2$ content of greater than about 55 wt. %.

11. A friction material as set forth in claim 1 wherein said organopolysiloxane resin is present in an amount of from about 1 to about 100 weight percent based on the total weight of a substrate material.

12. A friction material as set forth in claim 1 wherein said plurality of fibers are chosen from aramid fibers, carbon fibers, cellulose fibers, acrylic fibers, polyvinyl alcohol fibers, glass fibers, mineral fibers, and combinations thereof.

13. A friction material as set forth in claim 1 wherein said plurality of fibers comprise para-aramid fibers.

14. A friction material as set forth in claim 1 wherein said plurality of fibers comprise aramid pulp having a diameter of from about 2 to about 50 μm and a length of from about 3 to about 15 mm, and aramid floc having a diameter of from about 2 to about 50 μm and a length of no greater than about 3 mm.

15. A friction material as set forth in claim 1 wherein said plurality of fibers have a CSF of from about 300 to about 640.

16. A friction material as set forth in claim 1 wherein said plurality of friction particles are chosen from diatomaceous earth, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, cashew nut, rubber, and combinations thereof.

17. A friction material as set forth in claim 1 wherein said friction generating layer comprises:
(i) cellulose fibers;
(ii) diatomaceous earth particles; and, optionally,
(iii) elastomeric particles.

18. A friction material as set forth in claim 1 wherein said friction material has a median pore size of from about 2 to about 100 μm and/or a density of from about 0.4 to about 1.5 g/cm$^3$.

19. A friction plate comprising a friction material as set forth in claim 1 which is cured, wherein said bonding surface of said base of said cured friction material is bonded to a substrate.

20. A wet clutch assembly comprising said friction plate of claim 19 and a separator plate.

21. A friction material presenting a friction generating surface and a bonding surface facing opposite said friction generating surface, said friction material comprising the cured product of:
a plurality of fibers having a degree of fibrillation as measured according to Canadian Standard Freeness ("CSF") of from about 300 to about 800, said plurality of fibers comprising:
aramid pulp having a diameter of from about 2 to about 50 μm and a length of from about 3 to about 15 mm, and
aramid floc having a diameter of from about 2 to about 50 μm and a length of no greater than about 3 mm;
a plurality of friction particles; and
an organopolysiloxane resin comprising siloxy units independently represented by the following formulas:

$(R_1SiO_{3/2})$ and $(R_2SiO_{2/2})$, wherein each $R_1$ and $R_2$ is a methyl group.

* * * * *